(12) United States Patent
Delco et al.

(45) Date of Patent: Apr. 24, 2012
(10) Patent No.: US 8,166,474 B1

(54) SYSTEM AND METHODS FOR IMPLEMENTING NETWORK TRAFFIC MANAGEMENT FOR VIRTUAL AND PHYSICAL MACHINES

(75) Inventors: Matthew Delco, Sunnyvale, CA (US); Matthew Eccleston, San Francisco, CA (US); Matthew Ginzton, San Francisco, CA (US); Gustav Wibling, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1442 days.

(21) Appl. No.: 11/231,127

(22) Filed: Sep. 19, 2005

(51) Int. Cl.
*G06F 9/455* (2006.01)
*G06F 15/173* (2006.01)

(52) U.S. Cl. .......................... 718/1; 709/226
(58) Field of Classification Search ....... 718/1; 709/223
See application file for complete search history.

(56) References Cited

U.S. PATENT DOCUMENTS

| | | | |
|---|---|---|---|
| 5,987,557 A * | 11/1999 | Ebrahim | 710/200 |
| 6,609,153 B1 * | 8/2003 | Salkewicz | 709/223 |
| 7,689,723 B1 * | 3/2010 | DiMambro | 709/250 |
| 2002/0118644 A1 * | 8/2002 | Moir | 370/230.1 |
| 2006/0206300 A1 * | 9/2006 | Garg et al. | 703/27 |

OTHER PUBLICATIONS

Sugerman, Venkitachalam, & Lim, Virtualizing I/O Devices . . . , Proceedings of the USENIX Annual Technical Conference, Boston, Massachusetts, Jun. 25-30, 2001.

* cited by examiner

Primary Examiner — Camquy Truong

(57) ABSTRACT

A virtualization framework provides security between multiple virtual machines with respect to network communications between the virtual machines and between the virtual machines and a physical network coupled to the underlying physical computer platform. The virtualization framework includes a network interface controller driver that provides an interface to the platform network interface controller and supports execution of a plurality of virtual machines. Each virtual machine includes a virtual network interface controller that provides a network communications path between the virtual machines and to the network interface controller driver. Each virtual network interface controller further contains a programmable network packet filter that controls the selective transfer of network packets with respect to a corresponding virtual machine.

17 Claims, 4 Drawing Sheets

SYSTEM AND METHODS FOR IMPLEMENTING NETWORK TRAFFIC MANAGEMENT FOR VIRTUAL AND PHYSICAL MACHINES

BACKGROUND OF THE INVENTION

1. Field of the Invention

The present invention is generally related to data network traffic filtering and security and, in particular, to a system and methods of selectively controlling network data traffic originating from and directed to virtualized computer systems.

2. Description of the Related Art

Computer system virtualization architectures enable direct realization of a broad variety practical benefits in the implementation and management of computer systems, including both client and server-based systems. A virtualization architecture is generally defined by the ability to concurrently support multiple operating system environments on a single physical computer system hardware platform. Each operating system environment, typically referred to as a virtual machine, logically encapsulates a separate instance of an operating system and defines an execution space within which the operating system manages the execution of programs including user and server level applications.

As conventionally implemented, each virtual machine presents a local operating system instance with an emulated hardware platform, thereby allowing execution of a standard operating system without requiring modifications specifically to enable virtualization. The multiple virtual machines are, in turn, cooperatively managed and supported within a virtualization framework. A primary task of the virtualization framework is to coordinate and maintain the integrity of shared access to the various physical hardware platform components. A predominant vendor of computer virtualization systems is VMware, Inc., Palo Alto, Calif.

A principal advantage embodied by virtualization architectures is the ability to establish and enforce isolation between the multiple virtual machines that are concurrently hosted on a single, physical computer system. Programs executed in one virtual machine are essentially unaffected by and, conversely, essentially unable to affect the execution of programs in other virtual machines. This isolation enables the virtual machines to encapsulate and execute a different operating systems, whether based on type, such as Windows7 and Linux7, specific OS variant, such as WindowsXPJ or RedHat7 Linux, or OS version, such as may be distinguished by patch level, of an operating system. Even where virtual machines are used to run instances of the same operating system, different environment configurations can be implemented as needed to support different application versions, such as, for example, production use and ongoing development versions, and different tasks, such as for work and personal use.

Although the benefits of virtualization architectures are substantial, execution of multiple virtual machines on a single physical computer system adds certain complexities to existing management issues, including in particular security concerns. One added complexity arises from the need to provide appropriate security constraints between the applications running within the virtual machines, a host operating system if present, and the connected network environment. In a typical use scenario, a physical computer system may rely on an external firewall system, as typically implemented in a corporate or hosted provider network environment, to selectively filter network traffic to and from the physical computer system. Firewall system architectures are conventionally well-known as implementing various stateful and stateless network packet processing functions to selectively control the network traffic passed through the firewall system. The packet processing functions typically include discrete packet filtering, such as can be performed by the open source IPTables and IPChains software packages, and aggregated content packet filtering, as can be performed by various spam filter applications, all conventionally referred to generally as packet filtering.

In other typical use scenarios, the physical computer system may be used in a generally untrusted network environment. Typically, notebook and other mobile computer systems cannot presume external network protection. Equally, home computer systems must be guarded, particularly where a user has nominally verifiable rights to access a protected, typically corporate, network. In these cases, the conventional solution is to implement a client firewall application, based on open source packet filtering packages or proprietary packet filtering analogues, on the physical computer system. Doing so, however, increases the installation and management burden of the user and may degrade, to some potentially significant degree, the performance of the physical computer system. For devices that cannot support local execution of a firewall package, a hardware-based client firewall appliance is required.

In the case of a virtualization architecture, the presence of multiple virtual machines creates a security concern for network-based transactions between virtual machines and, in a host-based virtualization framework configuration, between the virtual machines and the underlying host operating system. In a hosted virtual machine configuration, the virtualization framework is executed in conjunction with a conventional host platform operating system. In an alternate virtualization architecture variant, a dedicated kernel can be implemented to directly support the virtualization framework. In both cases, a platform firewall application can be implemented as part of the host or dedicated kernel network stack to protect the physical computer system as a single entity. Although execution of programs within the virtual machines are isolated from one another and from the host operating system, the virtual machines can share a virtualization is framework-based network connection that may not be secured by a platform firewall application. The shared network connection may be established at a level above the effective operation of platform firewall application. In such instances, a firewall failure, or worse, an active compromise of the firewall, exposes all of the virtual machines to the inherent security risk. Even where the platform firewall application functions correctly, if a security breach, whether intentional or caused by the inadvertent execution of malware, arises from activity within one of the virtual machines, or from within the host operating system environment, the platform firewall application is unable to prevent the breach from freely spreading between the virtual machines and the host. The platform firewall application provides even less functional protection where the virtualization framework connects below the connection point of the platform firewall application to the platform network stack.

The conventional solutions include only implementing the single platform firewall and accepting the further risk of internal sources of security breaches. This has the benefit of incurring no more than the ordinary and expected management burden of implementing a firewall for the computer system as a single entity. This solution, however, has the negative affect of imposing a uniform performance penalty on all of the virtual machines independent of the actual network usage by the different virtual machines. An alternate solution is to additionally install and execute a firewall applications individually in the virtual machines. While this will improve the security protection of the discrete virtual machines, as well as better distribute the firewall performance load based on actual network usage, the increased burden of coordinating and maintaining multiple independent security profiles is both substantial and likely error prone. Without suitable oversight of the firewall configuration on each of the virtual machines, inadvertent and unexpected security exposures can be created that compromise not only the security of an individual virtual machine or the host operating system, but of the entire platform.

Consequently, there is a distinct need for a network traffic management system capable of performing firewall operations securely for multiple virtual machines and host operating system, if present, within a common virtualization framework.

SUMMARY OF THE INVENTION

Thus, a general purpose of the present invention is to provide an efficient network traffic management and security system for use within a virtualization framework.

This is achieved in the present invention by providing a virtualization framework that supports secure network communications among the virtual machines, host operating system if present, and a physical network coupled to the underlying physical computer platform. The virtualization framework includes a network interface controller driver that provides an interface to the platform network interface controller and supports execution of a plurality of virtual machines. Each virtual machine includes a virtual network interface controller that provides a network communications path between the virtual machines and to the network interface controller driver. Each virtual network interface controller further contains a programmable network packet filter that controls the selective transfer of network packets with respect to a corresponding virtual machine.

An advantage of the present invention is that the distributed implementation of packet filters in the individual virtual machines enables each virtual machine to discretely manage network communications with respect to all external entities, including the host operating system and other virtual machines. In addition, the present invention supports the coordinated management of the different packet filter configurations to ensure that security is maintained even where security concerns are changed.

Another advantage of the present invention is that the virtual machine network traffic packet filters are implemented in a fundamentally secure location relative to the potential execution of insecure or compromised applications anywhere within the host computer system platform. Locating the packet filters within the reserved space of a virtual machine limits inappropriate access by host-based applications and those executed in other virtual machines. Similarly, the effective positioning of the filters outside of the nominal application execution space of the guest operating systems precludes, as a practical matter, improper access by programs executed on the local guest operating system.

A further advantage of the present invention is that the distributed implementation of packet filters ensures a relatively efficient use of host computer system resources. Any increased performance loading due to network traffic processing is effectively allocated to the host or specific virtual machine that engenders the network traffic. Applications executing in the other virtual machines co-resident on the physical computer system platform are substantially unaffected.

Still another advantage of the present invention is that the virtual machine distributed packet filters can be securely established and custom configured, using administratively defined policy rule sets, prior to the initial execution of the corresponding virtual machines. Thus, the present invention ensures that the virtual machines are not exposed to an initialization exploit.

Yet another advantage of the present invention is that the policy rule sets can be defined to implement security controls on a per network interface basis, including individually for multiply homed virtual machines, for individual virtual machines, for a defined group of virtual machines, potentially including the host operating system, and administratively determined combinations. The policy rule sets can be further individualized based variously on the identity, role, and other operative characteristics of the virtual machines, the host computer system, and the connected network, thereby allowing different levels of qualified security. The present invention also supports the dynamic modification of individual policy rule sets to allow for on-the-fly management changes and automatically recognized changes in the attached networks, which is particularly useful in the case of mobile computer platforms.

DETAILED DESCRIPTION OF THE INVENTION

Figure 1:
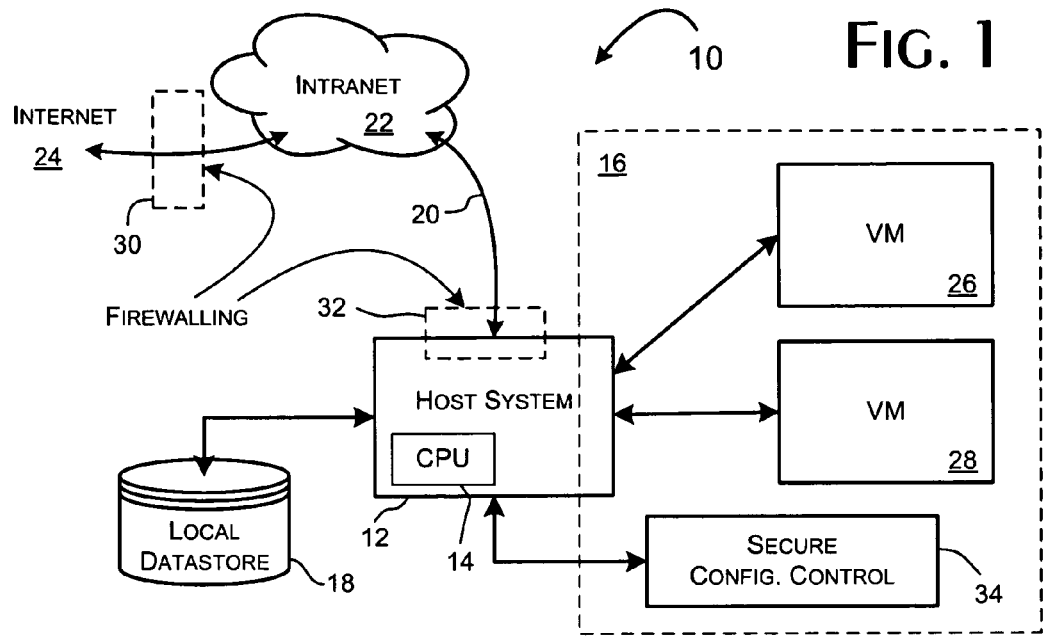
FIG. 1 is a block diagram of a computer system platform suitable for implementation of the present invention.

A computer system 10, demonstrating a preferred environment for implementation of the present invention, is shown in FIG. 1. A host system platform 12 includes a local processor 14 and memory 16 providing a program execution space. The host system platform 12 preferably supports a local datastore 18 and a network interface 20 permitting connection to a local intranet 22, as shown, and further, or directly in alternate scenarios, to a public communications network 24, such as the Internet.

In conventional use configurations, an independent firewall system 30 can be installed generally as shown to provide network protection to the intranet 22 including the host system platform 12. The firewall system 30 is conventionally a network appliance implementing any or all of a variety of packet inspection and control functions. For purposes of describing the present invention, the term packet filter is used to encompass packet filtering packages, such as exemplified by the conventional IPTables and IPChains packages, content filters, such as the well-known SpamAssassin and Clam Anti-Virus (ClamAV) packages, deep packet analysis and scrubbing packages, and other packages implementing network packet security functions.

Alternately, though more typically in conjunction, a packet filter application 32 is conventionally implemented and executed within the program execution space of the host system platform 12. Various network security and content filter applications for client system platform configurations are available from Symantec Corporation, Cupertino, Calif. Typically, these filter applications are loaded from the local datastore 18 and started subsequent to the initial execution of the host system platform 12 operating system.

Where the host system platform 12 further supports the execution of guest operating systems, here represented as virtual machines 26, 28, the individual guest operating system environments have an effectively shared security concern. The virtual machines 26, 28 are equally vulnerable to a failure or omission in the in the operation of the firewall system 30 or host-based packet filters 32. In order to establish network protections individualized to the virtual machines 26, 28, the conventional approach is to install and run separate packet filter applications within the normal program execution environment established by the guest operating systems loaded and executed within each virtual machine 26, 28. Unfortunately, such conventional packet filter applications impose a significant user burden to install and manage the filter configurations. A significant unmanaged security exposure therefore conventionally exists due to potential failures of users to correctly configure and maintain the packet filters applications.

In accordance with the present invention, managed packet filter components are implemented as part of the virtualization framework used in support of the virtual machines 26, 28. Separately configurable packet filter components are preferably implemented for each virtual machine 26, 28, and, in the preferred embodiments, for each network interface hosted by a virtual machine 26, 28, thus enabling fine-grained security control in multi-homed virtual machine scenarios.

The instances of the packet filter components are preferably executed as part of the virtual machines 26, 28, though outside of the program execution space allocated to and normally accessible by a guest operating systems. That is, in the preferred embodiments, the virtualization framework supports performance of world context switches, which involve saving and restoring all user and system visible state on the local processor 14, to effectively allow direct execution of the in-context virtual machine 26, 28 on the host system 12. Dedicated portions of the virtualization framework continue to execute both in the base non-virtual machine context and in the individual virtual machine 26, 28 contexts. The packet filter instances are executed at least in part within the individual virtual machine 26, 28 contexts, with the relative proportion being determined based on performance considerations. In alternate embodiments, where execution of the virtual machines 26, 28 is defined by separate threads of execution rather than world context switches, thread local memory spaces can be defined for each virtual machine 26, 28. Consequently, attempts by programs to directly access an instance of a packet filter, including by the locally executed guest operating system, can be effectively trapped by the virtual machine 26, 28 or host system 12 as an invalid memory address access.

Finally, a secure policy control subsystem 34 of the supporting virtualization framework is preferably used to secure and manage access to configuration information, typically as encrypted configuration files stored on the local datastore 18 or retrieved as structured data through a secure network connection with a remote configuration server accessible through the network 20. In either case, the configuration data can be retrieved to provide the packet filter components with filter policy rule sets that define the operating configuration of the individual filters. The packet filter components of the present invention are therefore both fundamentally secured against tampering and subject to secure central management.

Figure 2:
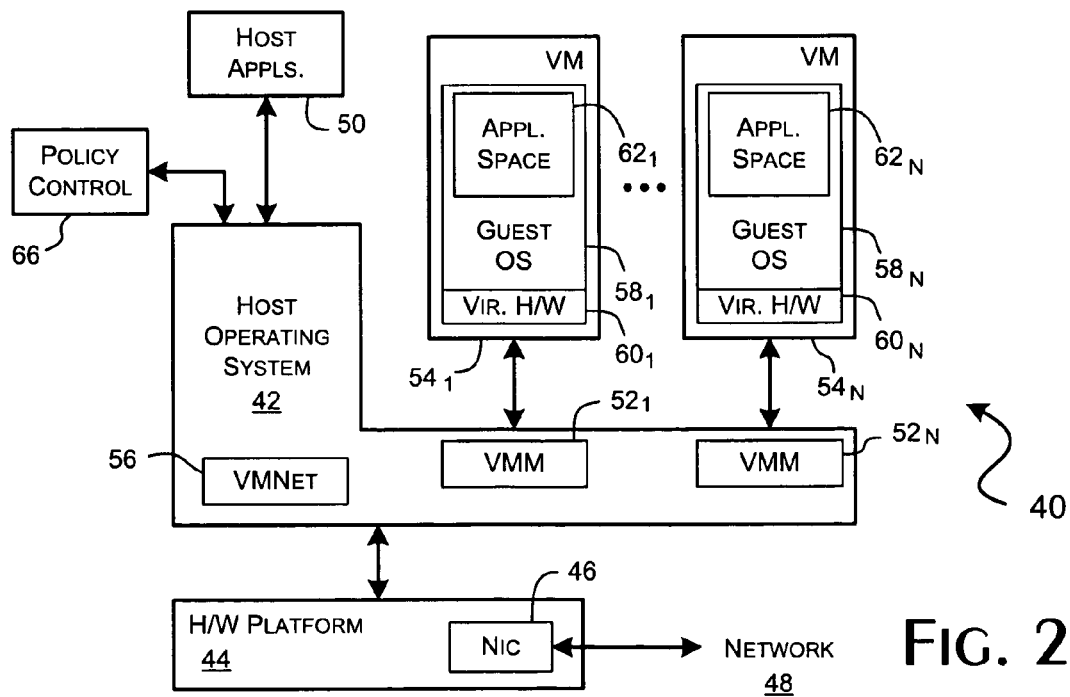
FIG. 2 is a block diagram of a preferred software architecture providing for the hosted support of multiple virtual machines implementing a preferred embodiment of the present invention.

A preferred embodiment of the present invention implemented in the context of a hosted virtualization framework 40 is shown in FIG. 2. A host operating system 42 is executed on a hardware platform 44 including a network interface controller 46. The hardware platform 44 also preferably includes a central processor 14 and a local datastore 18. The network interface controller 46 is coupleable to an external communications network 48. The host operating system 42 supports the execution of any number of conventional applications 50 and the components of the virtualization framework, which include instances of a virtual machine monitor (VMM) $52_{1-N}$ provided to support a set of one or more virtual machines (VM) $54_{1-N}$ and a virtual network controller (VMNet) 56 that provides coordinated routing of network traffic between the virtual machines $54_{1-N}$ and the various conventional interface points of a conventional network protocol stack, including a hardware specific network interface controller 46 driver, as incorporated within the host operating system 42.

In the preferred embodiments, the virtual machines $54_{1-N}$ are preferably executed as individual instances of a virtual machine application loaded and managed through separate virtual machine execution processes (designated as VMX processes) instantiated within the program execution space of the host operating system 42. The virtual machines $54_{1-N}$ functionally encapsulate guest operating systems $58_{1-N}$. Each of the virtual machines $54_{1-N}$, when executing, are effectively isolated from one another and from the host operating system 42 as a function of the applied virtual machine world context switch. The hardware platform 44, as programmed in conjunction with the world context switch, establishes conventional memory space controls that restrict the accessible memory space to that defined for the executing virtual machine $54_{1-N}$.

In turn, each virtual machine $54_{1-N}$, as executed, then preferably further defines a guest operating system execution space above a virtual hardware component layer $60_{1-N}$. The guest operating system execution space represents the apparent physical memory address space available to the guest operating system $58_{1-N}$. The individual guest operating system execution spaces are therefore logically coextensive with the instances of the guest operating systems $58_{1-N}$, including program execution spaces $62_{1-N}$ held available for the execution of applications by the guest operating systems $58_{1-N}$. As is typical of conventional operating systems, the guest operating systems $58_{1-N}$ define and constrain the execution of programs within the program execution spaces $62_{1-N}$ to preclude, at a minimum, memory accesses beyond the boundaries of the program execution spaces $62_{1-N}$.

The virtual hardware component layer $60_{1-N}$ of the virtual machines $54_{1-N}$ is preferably implemented as a coordinated set of software components that collectively interoperate to emulate a defined hardware platform, either directly or indirectly with support from the virtual machine monitor $52_{1-N}$, host operating system 42 resident drivers, and the underlying hardware platform 44. Instances of these software components are effectively executed as part of the virtual machines $54_{1-N}$, though external to the guest operating system execution spaces $58_{1-N}$.

Figure 3:
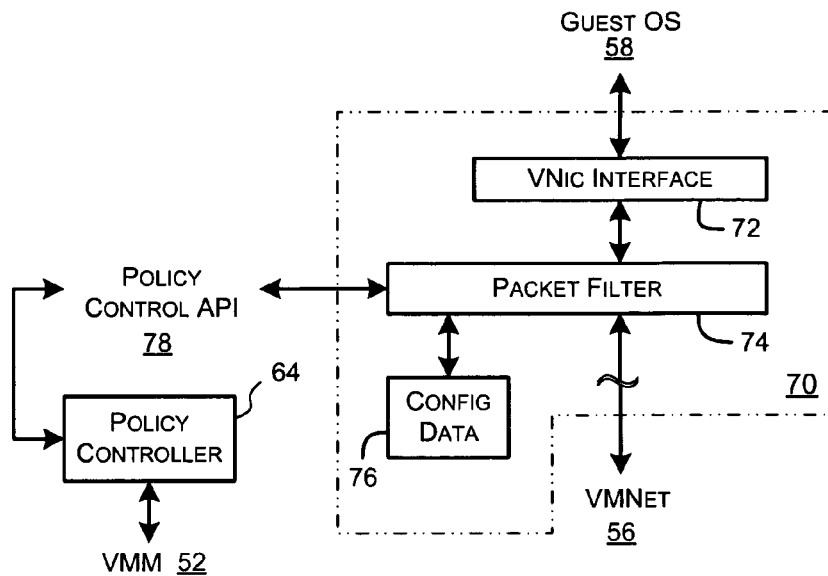
FIG. 3 is a block diagram of a preferred component architecture of a virtual network interface controller and packet filter, as implemented in a preferred embodiment of the present invention.

A virtual network interface controller (VNic) is preferably implemented and executed as a component within the virtual hardware component layer $60_{1-N}$. As shown in FIG. 3, in accordance with a preferred embodiment of the present invention, a virtual network interface controller component 70 includes, representationally, a virtual network interface layer 72 combined with a packet filter layer 74. The network interface layer 72 preferably implements an interface emulation of a conventional network interface controller, enabling a conventional vendor supplied network interface controller driver to be loaded and used by the guest operating system $58_{1-N}$. In effect, data link level network packet traffic is transferred by the network interface layer 72 between a guest operating system $58_{1-N}$ and the virtual network controller 56 through the packet filter layer 74.

In the preferred embodiments of the present invention, the packet filter layer 74 is implemented as a library component integral to the network interface layer 72. While direct coupling is preferred to reduce complexity and processing overhead, indirect coupling may be preferred to allow flexible, potentially dynamic in-configuration of different data packet filter components to provide alternate or additional feature sets beyond baseline packet examination, such as various combinations of externally defined network connection block lists and screening for executables, viral signatures, and content. In all cases, a set of policy rules that define the operational behavior of the packet filter layer 74 is preferably stored as configuration data in an in-memory table 76. A management program interface 78 is preferably provided to allow the setting and updating of the policy rule set held in the table 76. Preferably, the policy rule sets are provided preparsed from a text-based policy rule set representation to a compact configuration data form suitable for direct in-memory storage and use by the packet filter layer 74.

Figure 4:
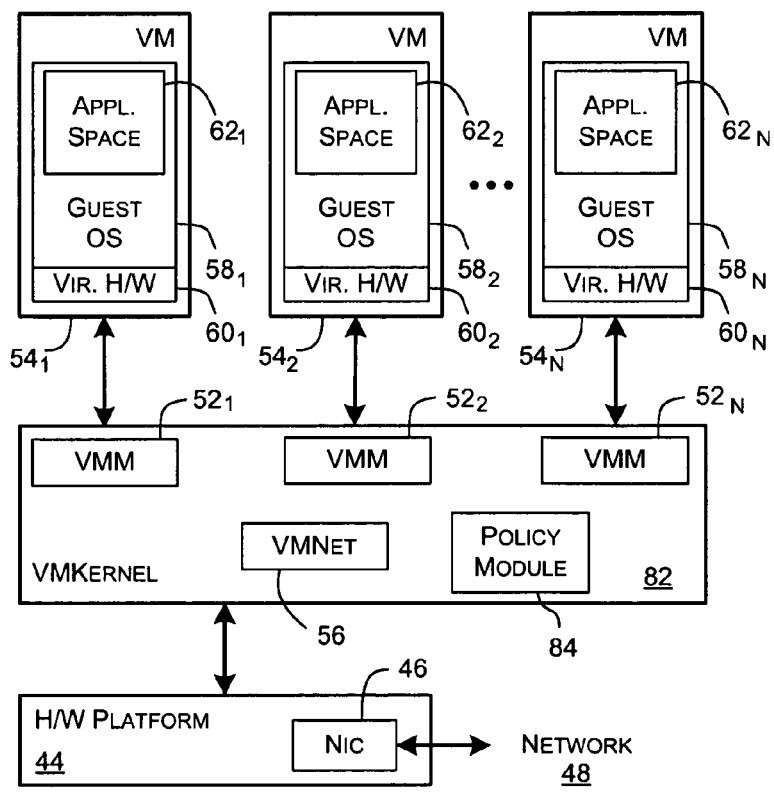
FIG. 4 is a block diagram of a preferred software architecture providing for standalone support of multiple virtual machines implementing a preferred embodiment of the present invention.

The present invention may be also implemented in conjunction with a dedicated, or standalone, virtualization framework 80, as shown in FIG. 4. While architecturally similar to the hosted virtualization framework 40, the dedicated virtualization framework 80 implements a dedicated kernel (VMKernel) 82 to support execution of the virtual machines $54_{1-N}$. As with the hosted virtualization framework 40, the dedicated kernel 82 implements VMX processes to manage the restricted memory spaces defined for the individual virtual machines $54_{1-N}$. The virtual machine monitor $52_{1-N}$ and virtual network controller 56 are preferably implemented as dedicated kernel 82 modules.

In both the hosted 40 and dedicated 80 virtualization framework embodiments, policy controllers 64 are preferably implemented as components within each of the virtual hardware component layers $60_{1-N}$ to manage the packet filtering functions of the virtual network interface controller components 70, as shown in FIG. 3. Each policy controller component 64 functions to manage the retrieval, parsing, as appropriate, and application of policy rule sets through the management program interfaces 78 of the virtual network interface controller components 70 present in the respective virtual machine $54_{1-N}$.

In a hosted virtualization framework 40, where a platform packet filter application is installed to control network traffic through the network protocol stack of the host operating system 42, an additional policy control component is preferably implemented, as shown in FIG. 2, as a host packet filter policy control application 66. In a preferred Windows-based embodiment of the present invention, the policy control application 66 is implemented as an augmented authd-based daemon application. The leveraged use of the existing authd application is primarily to take advantage of the underlying functionality nominally provided by the conventional authd service and to minimize system integration concerns with respect to the host operating system 42.

In the currently preferred embodiments of the present invention, the individual policy controller components 64, 66 operate independently of one another in managing the various virtual network interface controller components 70 and host platform packet filter. Alternate embodiments envisioned implement coordination between the policy controller components 64, 66 to ensure that, during dynamically applied policy rule set changes to the host platform and virtual machine policy filters, transient security exposures are not inadvertently allowed to exist among the virtual machines $54_{1-N}$, host operating system 42, and network 48. The coordinating communication can be shared equally between the policy controller components 64, 66, which is preferred, or a primary controller, such as the policy controller 66, can be used to centrally coordinate the timing of policy rule set changes. In the dedicated 80 virtualization framework embodiment, the centralized coordination function can be delegated to a kernel policy control module 84.

The policy controllers 64 preferably operate to initially and dynamically direct the configuration of the different packet filter layer 74 instances as implemented in the virtual machines $54_{1-N}$. The policy controller 66 preferably performs equivalently with respect to the platform packet filter application. Policy information is initially defined in terms of policy rule sets designateable as applicable to the host operating system 42, specified individual or groups of virtual machines $54_{1-N}$, or to specific packet filters 74. In the preferred embodiments of the present invention, the policy rule sets determine for the applicable packet filter 74 the network traffic that is to be restricted on a per-packet basis or that is to be monitored and conditionally restricted based on stateful analysis. Factors defined by rule sets for evaluation can include source and destination addressing, whether based on MAC, IP, IPX, or similar addresses or address ranges, the type of network traffic, such as broadcast, unicast, and multicast, the packet transmission protocol, such as ARP, IPX, IP, TCP, UDP, HTTP, and the like, the packet designated source and destination ports, including whether falling within privileged and unprivileged port ranges, the direction of the network traffic, and packet size. By default, DHCP protocol packets are enabled through the host-based packet filter as desired to support basic network to platform functions. Factors defined by the rule sets for consideration under stateful analysis can include the frequency of traffic related by source or type, and keywords, signatures, and other defining content discernable within the headers and payload content of individual and statefully related network traffic. Policy rule sets may further define process qualifications, including for example, the number of exceptions permitted before a particular network traffic stream is terminated and whether certain network traffic is to be logged.

Policy rule sets are preferably associated by provided identifiers with specific virtual network interface controllers 70. Each policy rule set is preferably expressed as a grouped series of statements that collectively define the set of restrictions to be applied by a corresponding packet filter 74. In a basic preferred embodiment, a series of policy rule sets are stored in a linear file structure. The first policy rule set sequentially retrieved for a corresponding virtual network interface controller 70 is processed and provided by the policy controller 64, 66 to the corresponding packet filter 74 via the configuration interface 78 for local storage in the associated configuration data table 76. Alternately, named or otherwise identifiable policy rule sets can be retrieved for application to specific packet filters 74.

The selection of policy rule sets by the policy controllers 64, 66 is preferably further qualified by defined zones of application. For purposes of the present invention, a network zone is defined by the unique characteristics of the network 48 then accessible through the network interface controller 46. The applicable characteristics can include network distinguishing features such as the current IP address or addresses dynamically assigned to the controller 46, the local IP subnet, whether a specific DHCP, DNS, or other server is known on or reachable through the network 48, whether certain named computers or network components are accessible within defined hop counts, and the resolved DNS domain or fully qualified names of machines attached to the local subnet. The current zone characteristics are preferably determined by the policy controller 64, 66 upon initialization, at periodic intervals, and in response to notices of a potentially significant change in the connected network as may be conventionally generated by the host operating system 42 and dedicated kernel 82.

In accordance with the present invention, a unified or separate persistently stored configuration files are retrievable upon request by the policy controllers 64, 66 from the local datastore 18. The files or identifiers within the files allow policy rule sets to be identified by zone and virtual network interface controller 70 identity. Alternately, named or otherwise identifiable policy rule sets may be retrieved from a designated policy server computer externally accessible via the network 48. A platform configuration controller 34, preferably implemented as a component of the hosted virtualization framework 40 or component module within the dedicated kernel virtualization framework 80, coordinates the selection and retrieval of policy rule set configurations from the local data store 18, the remote policy server, or both.

Figure 5:
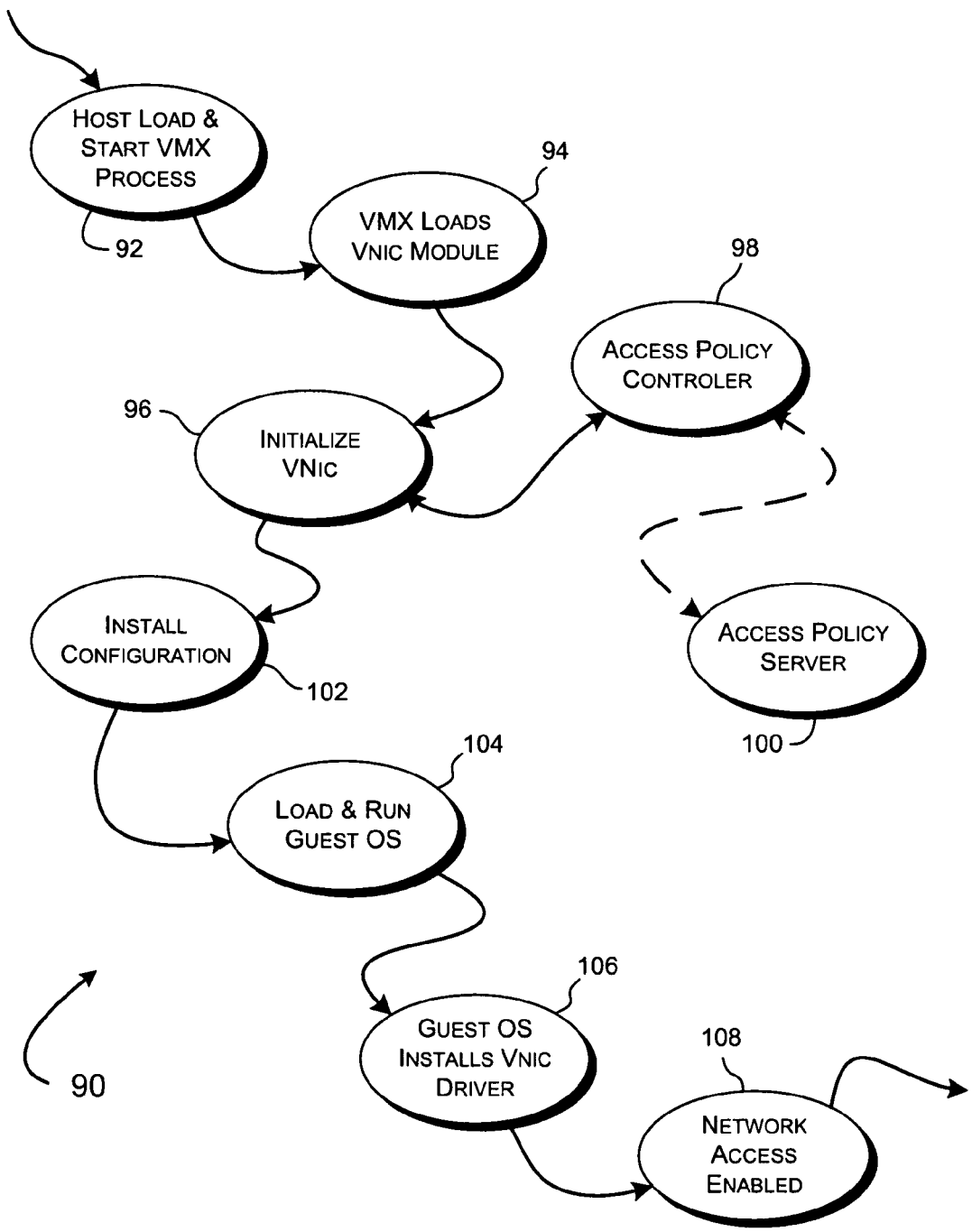
FIG. 5 provides a data and control flow diagram illustrating the initial loading and configuration of a packet filter in accordance with a preferred embodiment of the present invention.

A preferred process 90 of initializing a virtual network interface controller 70 is shown in FIG. 5. In launching a virtual machine $54_{1-N}$, a VMX process 92 is initially allocated to manage the execution of an instance of the virtual machine executable. As part of the initialization of the virtual machine $54_{1-N}$, one or more virtual network interface controllers 70 are loaded 94 and configured in as component elements of the virtual hardware layer $52_{1-N}$. The specific type of virtual network interface controller 70, which determines the particular hardware interface emulated, is determined from a virtual machine configuration file as obtained typically from the local datastore 18 via the secure configuration controller 34. Identifications of the newly loaded virtual network interface controllers 70 are provided to the policy controller 64, 66.

As part of the initialization 96 of a virtual network interface controller 70, a request for packet filter configuration data is made 98 to the policy controller 64, 66. If a current copy is not already present, the policy controller 64, 66 requests and receives an in-memory copy of the current policy role set configuration file. Preferably dependent on a virtual machine policy file, also accessed via the configuration controller 34, the policy role set configuration file is preferentially retrieved from the local datastore 18 or retrieved 100 from a remote policy server computer system accessible through the network 48. Once retrieved, the policy role set configuration file is then parsed by the policy controller 64, 66 subject to the current zone characteristics and identified virtual network interface controller 70 being initialized. The first policy rule set in the policy role set configuration file, whose zone and controller identity criteria match the current zone characteristics and identified virtual network interface controller 70, is then passed to and installed 102 by the corresponding packet filter 74. To reduce false failures to identify a zone, the policy rule set may specify unique network characteristics to match, but also meta-characteristics, such as match percentage or particular combinations of characteristics that are require to qualify a zone match.

Advantageously, the packet filter of a virtual network interface controller 70 is fully initialized prior to any execution of a guest operating system $58_{1-N}$ within the corresponding virtual machine $52_{1-N}$. Even if a zone and controller identity criteria match is not found, an administratively defined default packet filter configuration is established before any possible compromize of the guest operating system $58_{1-N}$.

A guest operating system $58_{1-N}$, of type specified by the virtual machine configuration file, is then loaded into the memory space of the virtual machine $52_{1-N}$ and run 104. As part of the conventional initialization process of the guest operating system $58_{1-N}$, a network interface controller driver is loaded and installed 106. This driver is conventionally selected based on the apparent hardware identity of the in virtual network interface controller 70. The driver is initialized and, typically, an IP address is assigned to the virtual network interface controller 70 through the conventional initialization processes of the guest operating system $58_{1-N}$. Network access, though only subject to the specific restrictions and controls established by the corresponding packet filter 74, is then available 108 to the guest operating system $58_{1-N}$.

Figure 6:
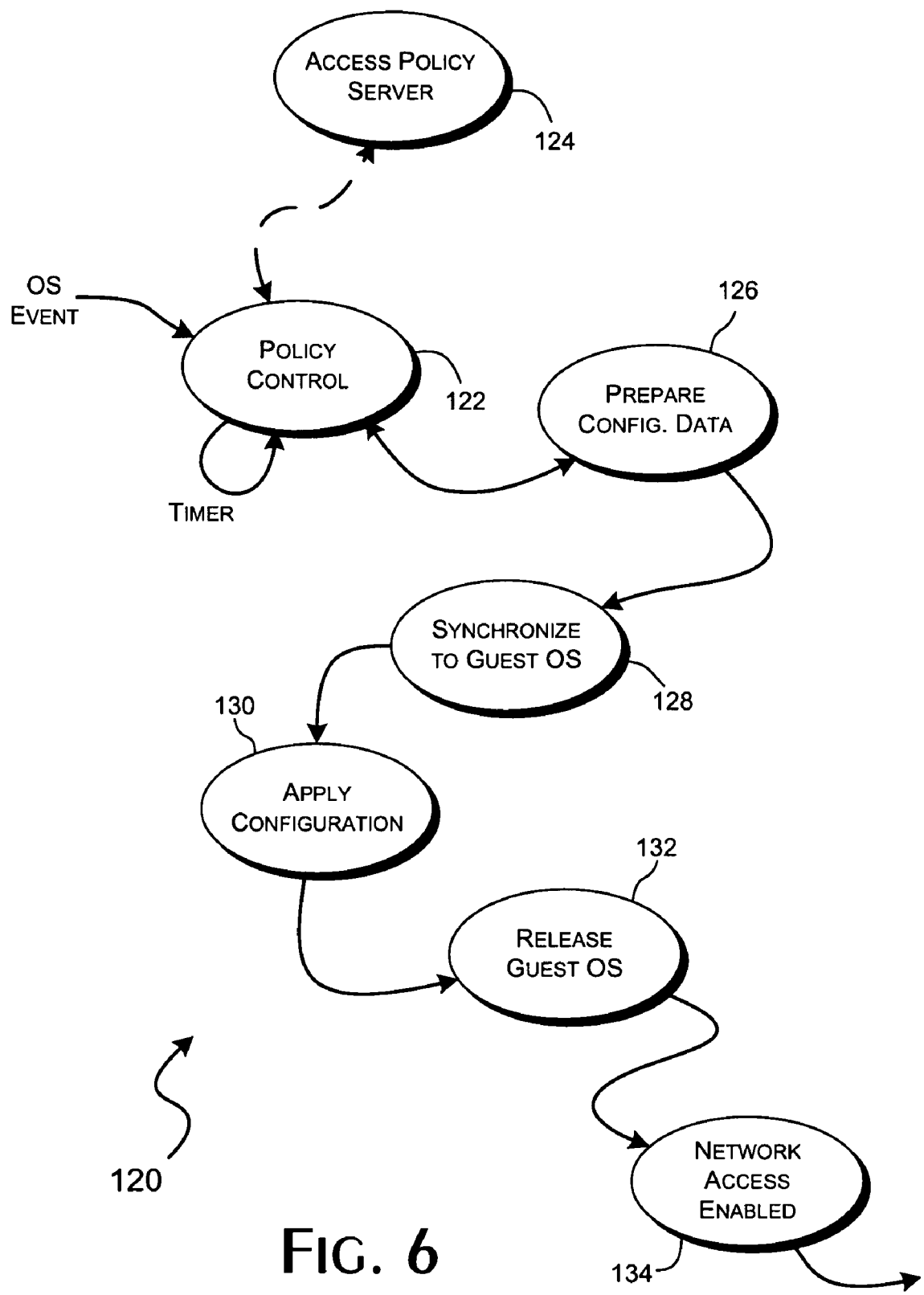
FIG. 6 provides a data and control flow diagram illustrating a dynamic reconfiguration of a packet filter in accordance with a preferred embodiment of the present invention.

A preferred process 120 for dynamically modifying the behavior of a packet filter 74 is shown in FIG. 6. In accordance with the present invention, a number of strategies can be used to ensure that the packet filter 74 behaviors implemented by the virtual machines $52_{1-N}$ quickly conform to the established policy rule sets. A basic strategy is to reevaluate and, as appropriate, reload the policy rule sets for the packet filters 74 whenever the policy role set configuration file is modified. Preferably, the policy controller 64, 66 periodically polls the policy role set configuration file for modifications in response to a periodic timer interrupt.

The policy controller 64, 66 preferably also actively monitors the network 46 for changes that might affect zone criteria matches. In the preferred embodiments of the present invention, this network monitoring is performed by registering with the network stack of the host operating system 42 or dedicated kernel 82 for conventional network configuration changes. Additionally, the policy controller 64, 66 periodically probes the network 48 for remote changes, such as the reachability of a defined network device, that may affect the matching of zone criteria.

The policy controller 64, 66 can also be directly instructed to reevaluate and, as appropriate, reload the policy rule sets. In a preferred embodiment, a reevaluation directive can be supplied to the policy controller 64, 66 from a local administrative account or from a remote management or policy server computer system with appropriate security rights 124.

On determining that a packet filter 74 of a particular virtual machine $52_{1-N}$ is to be updated, corresponding configuration data is prepared 126. The policy controller 64, 66 synchronizes 128 with the operation of the virtual network interface controller 70 as necessary to preserve the integrity of any network packets being processed through the virtual network interface controller 70. The configuration data is then applied 130 to the virtual network interface controller 70. The guest operating system is then released 132, 134 to continue processing network packets through the virtual network interface controller 70.

Thus, a system and methods for efficiently and securely managing network traffic with respect to virtual machines in a virtualization framework has been described. In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A computer system implementing a virtualization framework that supports execution of multiple virtual machines secured with respect to network communications between the virtual machines and as between the virtual machines and a physical network coupled to said computer system, said computer system comprising:
a memory that provides a program execution space;
a processor coupled to said memory to execute a program within said program execution space;
a network interface controller coupled to said processor and coupleable to a communications network; and
a virtualization framework provided within said program execution space for execution by said processor, wherein said virtualization framework includes a network interface controller driver that provides an interface to said network interface controller and wherein said virtualization framework includes a plurality of virtual machines, wherein each of said virtual machines include a virtual network interface controller and wherein each of said virtual network interface controllers includes a network packet filter, wherein each of said network packet filters, when executed by said processor, selectively filters network packets with respect to a corresponding one of said virtual machines such that a network packet that includes destination information associated with a particular destination is blocked by at least one of said network packet filters from arriving at the particular destination;
wherein each of said network packet filters is initialized with predetermined configuration data through the execution of said virtualization framework prior to an initial execution of said plurality of virtual machines;
a data store providing for a persistent storage of a packet filter configuration data file, wherein execution of said virtualization framework provides for a secure storage and retrieval of said packet filter configuration data file, and wherein said packet filter configuration data file contains said predetermined configuration data.

2. The computer system of claim 1 wherein said data store is a data storage device locally attached to said computer system and wherein said packet filter configuration data file is encrypted as persistently stored by said data storage device.

3. A method of securing network communications between virtual machines hosted by a physical computer system and for network communications conducted by a virtual machine via a communications network connected to the physical computer system, said method comprising the steps of:
providing for an execution of a plurality of virtual machines within a virtual framework hosted on a physical computer platform, each of said plurality of virtual machines being executable in a respective protected process space and wherein each of said plurality of virtual machines include a guest operating system that defines an executable application space that is a subspace of said respective protected process space;
providing, within each said respective protected process space and external to said subspace, a network packet filter that provides for selective filtering of network packet traffic transmitted with respect to a corresponding one of said guest operating systems; and
providing for a programming of each of said network packet filters to define selective filtering constraints on a transmission of network packet traffic with respect to respective ones of said guest operating systems such that a network packet that includes destination information associated with a particular destination is blocked by at least one of said network packet filters from arriving at the particular destination;
wherein each of said network packet filters is initialized with predetermined configuration data through the execution of said virtual framework prior to an initial execution of said plurality of virtual machines;
a data store providing for a persistent storage of a packet filter configuration data file, wherein execution of said virtual framework provides for a secure storage and retrieval of said packet filter configuration data file, and wherein said packet filter configuration data file contains said predetermined configuration data.

4. The method of claim 3 further comprising the step of determining respective policy sets that determine the programming to said network packet filters based on network subnets directly accessible by said physical computer system.

5. The method of claim 4 wherein each of said plurality of virtual machines includes a virtual network interface controller and wherein each of said network packet filters are respectively implemented as components of said virtual network interface controllers.

6. The method of claim 5 wherein said respective policy sets define selective filtering constraints on the transmission of network packet traffic between said plurality of virtual machines.

7. The method of claim 6 further comprising the steps of:
responding to changes in the network subnets directly accessible by said physical computer system by redetermining said respective policy sets; and
providing said respective policy sets to said plurality of virtual machines to establish the programming of said network packet filters.

8. A component system for securing network operations mutually between a plurality of virtual machines and a communications network, wherein said plurality of virtual machines are provided for execution within a virtualization framework on a physical computer system, said component system comprising:
a first component containing a configurable network packet filter wherein a plurality of instances of said configurable network packet filter are executable by said physical computer system within process contexts corresponding to said plurality of virtual machines, wherein each of said plurality of instances of said configurable network packet filter is coupled for execution in combination with an instance of a virtual network interface component, said first component exposing a defined configuration interface, wherein said configurable network packet filter selectively filters network packets such that a network packet that includes destination information associated with a particular destination is blocked by said configurable network packet filter from arriving at the particular destination; and a second component containing a policy data file parser wherein an instance of said second component is executable by said physical computer system to evaluate a configuration data file with respect to said plurality of virtual machines, said instance of said second component determining sets of packet filter configuration data applicable to said instances of said configurable network packet filter, said second component implementing a defined configuration control interface through which said instance of said second component provides said sets of packet filter configuration data to said defined configuration interface of said plurality of instances of said configurable network packet filter;

wherein said physical computer system includes a network interface controller coupleable to an external communications network, wherein said virtual framework includes a network driver component coupled to said network interface controller, wherein said network driver component is accessible by said instance of said second component via said defined configuration control interface, wherein said instance of said second component evaluates said configuration data file dependent on the relative accessibility of predetermined network connections via said external communications network.

9. The component system of claim 8 wherein said sets of packet filter configuration data reside within said configuration data file parseable with respect to said predetermined network connections.

10. The component system of claim 9 wherein said sets of packet filter configuration data reside within said configuration data file are further parseable with respect to one or more instances of said first component identified with respect to instances of said virtual network interface components.

11. The component system of claim 10 wherein said sets of packet filter configuration data define selective constraints on a passage of network packets through said one or more instances of said first component.

12. The component system of claim 11 wherein said configuration data file is retrievable by said second component from a persistent data store.

13. A secure virtual machine architecture providing discrete network security controls for each virtual machine supported on a physical computer system platform, said virtual machine architecture comprising:
 a memory space;
 a virtualization framework executable within the memory space of a physical computer system platform including a physical network interface controller, said virtualization framework hosting a coordinated execution of virtual machines within the memory space of said physical computer system platform; and
 a plurality of virtual machines hosted for execution within said virtualization framework, each of said plurality of virtual machines incorporating a guest operating system that establishes a defined operating system execution space, each of said plurality of virtual machines including a virtual network interface controller accessible by a respective guest operating system, wherein each of said virtual network interface controllers emulates a predetermined network interface controller and wherein each of said virtual network interface controllers further implements a programmable network packet filter for selectively filtering network packets passed between said guest operating systems and between said guest operating systems and said physical network interface controller such that a network packet that includes destination information associated with a particular destination is blocked by at least one of said programmable network packet filters from arriving at the particular destination;
 wherein each of said network packet filters is initialized with predetermined configuration data through the execution of said virtual framework prior to an initial execution of said plurality of virtual machines;
 a data store providing for a persistent storage of a packet filter configuration data file, wherein execution of said virtual framework provides for a secure storage and retrieval of said packet filter configuration data file, and
 wherein said packet filter configuration data file contains said predetermined configuration data.

14. The secure virtual machine architecture of claim 13 wherein said virtualization framework includes a secure policy controller that determines respective policy sets to be applied to said programmable network packet filters.

15. The secure virtual machine architecture of claim 14 wherein said secure policy controller determines said respective policy sets based on one or more network subnets directly accessible through said physical network interface controller.

16. The secure virtual machine architecture of claim 15 wherein said secure policy controller determines said respective policy sets from a policy configuration file retrievable by said secure policy controller from a secure storage location.

17. The secure virtual machine architecture of claim 16 wherein said secure policy controller is dynamically responsive to changes in said one or more network subnets directly accessible through said physical network interface controller to redetermine said respective policy sets and to reapply said respective policy sets to said programmable network packet filters.

* * * * *